(12) United States Patent
Kato et al.

(10) Patent No.: US 10,803,867 B2
(45) Date of Patent: Oct. 13, 2020

(54) DIALOGUE SYSTEM AND DOMAIN DETERMINATION METHOD

(71) Applicant: TOYOTA INFOTECHNOLOGY CENTER CO., LTD., Tokyo (JP)

(72) Inventors: Sei Kato, Kawasaki (JP); Takuma Minemura, Hasuda (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 26 days.

(21) Appl. No.: 16/151,664

(22) Filed: Oct. 4, 2018

(65) Prior Publication Data

US 2019/0108836 A1    Apr. 11, 2019

(30) Foreign Application Priority Data

Oct. 10, 2017    (JP) ................................ 2017-196868

(51) Int. Cl.
| | |
|---|---|
| *G10L 15/22* | (2006.01) |
| *G10L 15/26* | (2006.01) |
| *G10L 13/02* | (2013.01) |
| *H04L 12/58* | (2006.01) |
| *G06F 40/20* | (2020.01) |

(52) U.S. Cl.
CPC .............. *G10L 15/22* (2013.01); *H04L 51/02* (2013.01); *G06F 40/20* (2020.01); *G10L 13/02* (2013.01); *G10L 15/26* (2013.01); *G10L 2015/223* (2013.01); *G10L 2015/225* (2013.01)

(58) Field of Classification Search
CPC ....................................................... G10L 15/22

USPC ......................................................... 704/200
See application file for complete search history.

(56) References Cited

U.S. PATENT DOCUMENTS

| | | | | |
|---|---|---|---|---|
| 5,999,904 A | * | 12/1999 | Brown ..................... | G10L 15/22 704/200 |
| 10,181,322 B2 | * | 1/2019 | Hakkani-Tur .......... | G10L 15/22 |
| 2011/0153322 A1 | * | 6/2011 | Kwak ..................... | G10L 15/22 704/235 |
| 2015/0179168 A1 | * | 6/2015 | Hakkani-Tur .......... | G10L 15/22 704/257 |

OTHER PUBLICATIONS

Ikeda et al. "Integrating Topic Estimation and Dialogue History for Domain Selection in Multi-Domain Spoken Dialogue Systems", IPSJ Journal, vol. 50.2, pp. 488-500, 2009.

* cited by examiner

*Primary Examiner* — Huyen X Vo
*Assistant Examiner* — Timothy Nguyen
(74) *Attorney, Agent, or Firm* — Oliff PLC (57) ABSTRACT

A dialogue system, comprises an input unit configured to acquire utterance contents of a user in a dialogue; a mode determining unit configured to determine, based on the utterance contents acquired by the input unit, whether a mode of the dialogue is task-oriented or non-task-oriented; a plurality of intention understanding units each corresponding to a specific domain; and a domain determining unit configured to determine, when the mode of the dialogue is task-oriented, a domain of the dialogue based on a result of intention understanding of the utterance contents performed using each of the plurality of intention understanding units.

11 Claims, 5 Drawing Sheets

DIALOGUE SYSTEM AND DOMAIN DETERMINATION METHOD

CROSS REFERENCE TO RELATED APPLICATION

This application claims the benefit of Japanese Patent Application No. 2017-196868, filed on Oct. 10, 2017, which is hereby incorporated by reference herein in its entirety.

BACKGROUND

Technical Field

The present invention relates to a dialogue system and, in particular, to a domain determination method in a dialogue.

Background Art

Advances in natural language processing technology and, particularly, in intention understanding technology have led to advances in chatbot-type dialogue systems utilizing a text chat user interface. As a corollary of such technology evolution, it is anticipated that spoken dialogue systems utilizing an existing chatbot-type dialogue system will be realized.

Such a chatbot-type spoken dialogue system desirably not only performs task-oriented dialogues but also enables task-oriented dialogues to segue into non-task-oriented dialogues. In this case, a task-oriented dialogue refers to a dialogue performed with a goal in mind and examples thereof include dialogues for inquiring about weather information, reserving a restaurant table, and making a hotel reservation. A non-task-oriented dialogue refers to a dialogue other than task-oriented dialogues and examples thereof include a desultory chat without any particular object.

An example of a dialogue including both a task-oriented dialogue and a non-task-oriented dialogue is as follows.
U1: Are you free tonight?
U2: Yes I am.
U3: I'm free too.
U4: How about going out for dinner?
U5: Sounds nice.
U6: What would you like?
U7: How about French?
U8: Great idea. Let me check for vacancies.
U9: Which French restaurant with vacancies do you recommend for dinner tonight?
S1: How about XXX? They have a wonderful AAA.
U10: Anywhere else?
S2: What about YYY? Their BBB is really good.
U11: Okay, make a reservation there.

In the example described above, U represents a user utterance and S represents a system utterance. In addition, U1 to U8 constitute a non-task-oriented dialogue while U9 and thereafter constitute a task-oriented dialogue. Moreover, while the system does not participate in the non-task-oriented dialogue in the example described above, the system may participate in a non-task-oriented dialogue instead.

In order for a dialogue system to output an appropriate response, the dialogue system must accurately understand an utterance intention of a user. A plurality of intention understanding engines each corresponding to a unique domain (conversation topic) may conceivably be used in order to accommodate various domains. In addition, a method of constructing a system by integrating individual domains so that new domains can be readily added has been proposed (Non Patent Literature 1). As a method of domain selection in such architecture, in Non Patent Literature 1, contents of an utterance by a user is passed to an intention understanding engine in each domain to determine which domain the utterance contents correspond to.

CITATION LIST

Non Patent Literature 1
Satoshi Ikeda and others, "Integrating Topic Estimation and Dialogue History for Domain Selection in Multi-Domain Spoken Dialogue Systems", IPSJ Journal 50.2 (2009), 488-500

SUMMARY

In the method disclosed in Non Patent Literature 1, entire contents of an utterance by a user are to be passed to each intention understanding engine. Each intention understanding engine determines whether or not the contents of the utterance fit a predetermined intention and returns a result of the determination. At this point, when the contents of the utterance by a user do not correspond to the predetermined intention of any of the intention understanding engines, processing becomes wasteful and inefficient.

In consideration of the problem described above, an object of the present invention is to provide a dialogue system capable of efficiently determining an appropriate domain from contents of an utterance by a user.

In order to achieve the object described above, a dialogue system according to the present invention determines whether a dialogue is task-oriented or non-task-oriented, performs intention understanding using a plurality of intention understanding units when the dialogue is task-oriented, and determines a domain based on a result of the intention understanding. When the dialogue is non-task-oriented, domain determination using intention understanding units is often ineffective. The dialogue system according to the present invention can improve processing efficiency by performing domain determination using intention understanding units when the dialogue is task-oriented.

More specifically, the dialogue system according to the present invention includes an input unit, a mode determining unit, an intention understanding unit, and a domain determining unit.

The input unit acquires utterance contents of a user in a dialogue. The input unit may acquire the utterance contents from the user in a text format or in an audio format. When the utterance contents are to be acquired in an audio format, the input unit is favorably constituted by a speech input unit which acquires uttered speech of the user and a speech recognizing unit which performs speech recognition of the uttered speech to acquire a text of the utterance contents.

The mode determining unit determines, based on the utterance contents acquired by the input unit, whether a present mode of the dialogue is task-oriented or non-task-oriented. In this case, a task-oriented dialogue refers to a dialogue performed with a specific goal in mind and a non-task-oriented dialogue refers to a dialogue that is not a task-oriented dialogue. The determination of whether a dialogue is task-oriented or non-task-oriented may be performed by, for example, a discriminator generated using machine learning (for example, reinforcement learning).

The plurality of intention understanding units are respectively configured to understand utterance intentions of a specific domain. Moreover, a domain in a dialogue refers to a range of topics (that can be) handled by an intention understanding unit. For example, a single intention understanding unit is configured to calculate, for each of a plurality of predetermined intentions in a domain, a certainty factor representing whether or not an utterance by a user fits each intention. The certainty factor indicating that a user utterance has a specific intention may be determined by vectorizing utterance contents and measuring a distance between a position of the user utterance and a center of gravity position of the specific intention in a vector space.

The domain determining unit is configured to perform, when the mode of the dialogue is task-oriented, domain determination using the intention understanding unit. For example, the domain determining unit may pass utterance contents of a user to a plurality of intention understanding units to acquire certainty factors of the utterance contents fitting a plurality of predetermined intentions, and determine a domain based on the certainty factors.

When the mode of the dialogue is non-task-oriented, the domain determining unit determines a domain using a method that differs from the above. For example, the domain determining unit may be configured to determine a domain from a word string included in utterance contents of a user when the dialogue mode is non-task-oriented.

According to a dialogue system configured as described above, since a new domain can be accommodated by adding an intention understanding unit, the system is highly scalable. In a dialogue system including a plurality of intention understanding units, executing an intention understanding process by passing utterance contents of a user to all of the intention understanding units increases processing load. Cases where an intention can be understood by an intention understanding unit are mostly when the dialogue is task-oriented, and intention understanding by an intention understanding unit is often difficult when the dialogue is non-task-oriented. In consideration thereof, the dialogue system according to the present invention can improve processing efficiency without sacrificing accuracy of domain determination by performing domain determination using intention understanding units when the dialogue is task-oriented and by performing domain determination without using intention understanding units when the dialogue is not task-oriented.

In the present invention, when distributions of certainty factors calculated by a plurality of intention understanding units differ from one another, it is difficult to compare certainty factors calculated by different intention understanding units. In consideration thereof, the plurality of intention understanding units are desirably configured to output certainty factors with respect to a prescribed number of intentions with high certainty factors. In this case, the prescribed number is common to all intention understanding units. In addition, while each intention understanding unit outputs certainty factors with respect to a plurality of (for example, the prescribed number described above) intentions, calculation criteria of the certainty factors are desirably the same for the plurality of intention understanding units. For example, a sum (total) of a plurality of certainty factors is favorably normalized (in other words, adjusted so as to take a same value, typically, 1, for all intention understanding units). Furthermore, a kurtosis (third-order moment) or a skewness (fourth-order moment) of a distribution of certainty factors with respect to a plurality of intentions output by each intention understanding unit are also favorably normalized. Accordingly, the certainty factors output by the plurality of intention understanding units can be readily compared with each other.

In the present invention, when the dialogue mode is switched between the task-oriented mode and the non-task-oriented mode, the domain determining unit favorably determines a domain after the switch by taking into consideration a domain before the switch. For example, when the dialogue mode is switched from the non-task-oriented mode to the task-oriented mode, instead of simply determining a domain based on certainty factors calculated by the intention understanding units, a last domain is favorably made more likely to be selected by, for example, applying a correction to increase the certainty factor with respect to the last domain. The same applies when the dialogue mode is switched from the task-oriented mode to the non-task-oriented mode. Accordingly, since a present domain can be determined in consideration of a previous domain, domain determination accuracy is improved.

Moreover, the present invention can be considered a dialogue system including at least a part of the units described above. In addition, the present invention can also be considered a domain determination method carried out by the dialogue system described above. Furthermore, the present invention can also be considered a computer program that causes these methods to be executed by a computer or a computer-readable storage unit that non-transitorily stores the computer program. The respective units and processes described above can be combined with one another in any way possible to constitute the present invention.

According to the present invention, an appropriate domain can be efficiently determined from utterance contents of a user in a dialogue system.

DESCRIPTION OF THE EMBODIMENTS

A dialogue system 1 according to the present embodiment is a spoken dialogue system which carries out a spoken dialogue with a user (a person). One or a plurality of users may participate in a dialogue. In addition, the present dialogue system 1 accommodates both a dialogue without a specific goal (a non-task-oriented dialogue) such as a desultory chat and a dialogue performed with a goal in mind (a task-oriented dialogue). Furthermore, in order to be able to hold dialogues on a plurality of conversation topics (domains), the present dialogue system 1 uses a plurality of dialogue engines (chatbots) each corresponding to a unique domain.

Configuration

Figure 1:
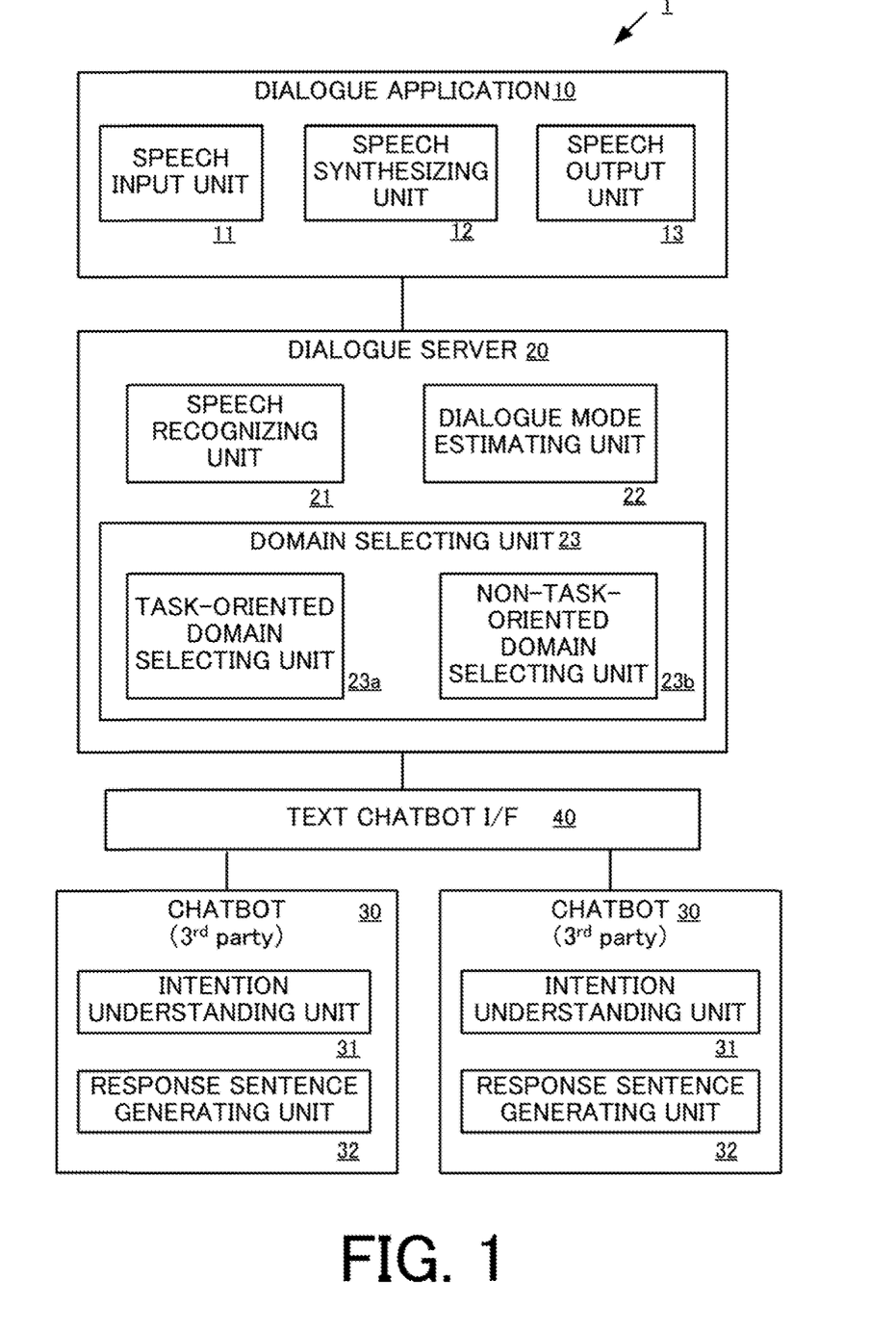
FIG. 1 is a diagram showing a configuration of a dialogue system according to an embodiment.

FIG. 1 is a diagram showing a configuration of the dialogue system 1 according to the present embodiment. As shown, the dialogue system 1 is configured to include a dialogue application 10, a dialogue server 20, and a plurality of chatbots 30. The dialogue application 10 is realized by a smartphone, a personal computer (PC), or the like owned by a user. The dialogue server 20 is realized by a computer configured to be capable of communicating with the dialogue application 10. The chatbot 30 is realized by a computer managed by a business operator (a third party) who differs from a business operator managing the dialogue server 20.

The dialogue application 10 includes a speech input unit 11, a speech synthesizing unit 12, and a speech output unit 13 as functional units thereof. These functional units are realized by a microprocessor (a calculation processing unit) of a computer by executing a program. The speech input unit 11 acquires uttered speech of a user from a microphone. The speech acquired by the speech input unit 11 is sent to the dialogue server 20. The speech synthesizing unit 12 acquires an utterance text from the dialogue server 20 and generates speech corresponding to the utterance text by speech synthesis. The speech output unit 13 outputs the speech generated by the speech synthesizing unit 12 from a speaker.

The dialogue server 20 includes a speech recognizing unit 21, a dialogue mode estimating unit 22, and a domain selecting unit 23 as functional units (functional modules) thereof. These functional units are realized by a microprocessor (a calculation processing unit) of a computer by executing a program. The dialogue server 20 converts utterance contents of a user into a text and generates a response sentence to the user using the chatbot 30 in accordance with a conversation topic.

The speech recognizing unit 21 applies a speech recognition process to uttered speech obtained from the dialogue application 10 and converts utterance contents into a text. Known techniques such as model-based methods using an acoustic model, a language model, or a pronunciation dictionary may be applied for the speech recognition process. Moreover, as preprocessing of speech recognition, the speech recognizing unit 21 may perform preprocessing such as noise elimination, speaker separation, and utterance section detection.

The dialogue mode estimating unit 22 estimates whether a dialogue currently being performed is a task-oriented dialogue or a non-task-oriented dialogue. The dialogue mode estimating unit 22 estimates a present dialogue mode using a discriminator learned in advance by reinforcement learning such as Q-learning. For example, learning of the discriminator may be performed as follows. First, as internal states, a plurality of states including a completely task-oriented state and a completely non-task-oriented state are defined, and an appropriate response sentence generation rule corresponding to each state is determined. In addition, a reward in a conversation is defined such that the smoother and longer the conversation, the higher the reward to be gained. Furthermore, a conversation is actually carried out with a user while performing state transitions, and criteria of state transition (a reward expected from a state transition) in the discriminator are updated so as to maximize the reward gained in the conversation. A discriminator capable of appropriately estimating the dialogue mode is obtained by repetitively performing such learning.

The domain selecting unit 23 selects a domain in a present dialogue. The domain selecting unit 23 includes a task-oriented domain selecting unit 23a which is effective when the present dialogue is task-oriented and a non-task-oriented domain selecting unit 23b which is effective when the present dialogue is non-task-oriented. Detailed operations of the respective domain selecting units will be provided later.

Moreover, although not shown, the dialogue server 20 transmits uttered speech (or a recognition result thereof) acquired from the dialogue application 10 of a given user to the dialogue application 10 of another user in order to be able to accommodate a dialogue between the users.

The chatbot 30 includes an intention understanding unit (an intention understanding engine) 31 and a response sentence generating unit 32 as functional units thereof. These functional units are realized by a microprocessor (a calculation processing unit) of a computer by executing a program. Moreover, while two chatbots 30 are shown in the diagram, there may be one or three or more chatbots 30 and a number thereof is not particularly limited.

The intention understanding unit 31 understands an intention of an utterance text (utterance contents) acquired from the dialogue server 20. In the present embodiment, with respect to each of a plurality of intentions determined in advance, the intention understanding unit 31 calculates a likelihood (a certainty factor) of the utterance text matching the intention. The response sentence generating unit 32 generates a response sentence text for responding to the utterance text acquired from the dialogue server 20. A method of generating a response sentence is not particularly limited and any known method can be used.

Moreover, the dialogue system 1 according to the present embodiment is capable of using chatbots 30 provided by a third party in order to be able to accommodate dialogues of a plurality of domains. To this end, an interface (a text chatbot interface) 40 between the dialogue server 20 and the chatbots 30 is defined and communication is performed between the dialogue server 20 and the chatbots 30 in accordance with the interface.

Contents of Processing

Figure 2:
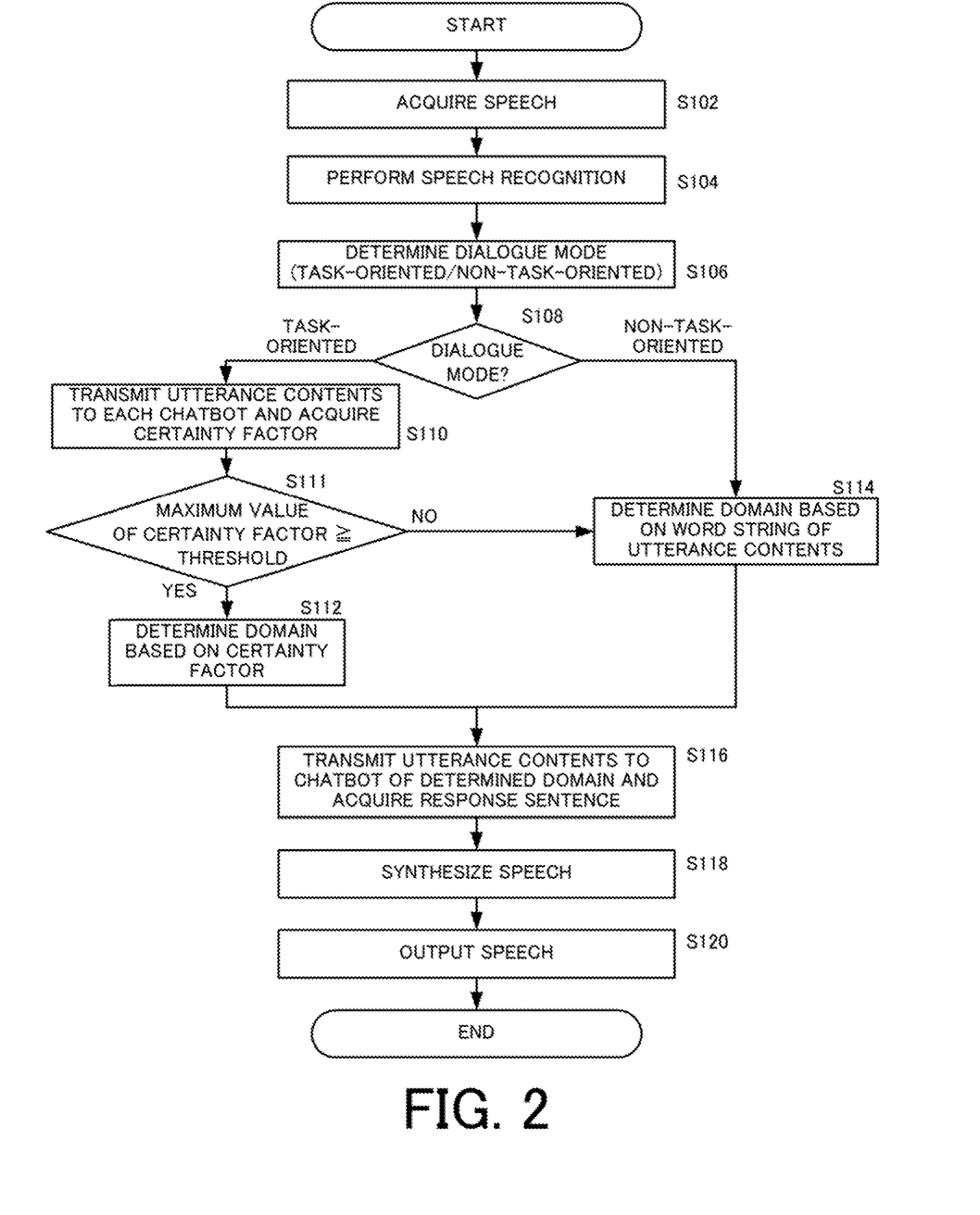
FIG. 2 is a flow chart showing a flow of spoken dialogue processing in the dialogue system according to the embodiment.
Figure 3:
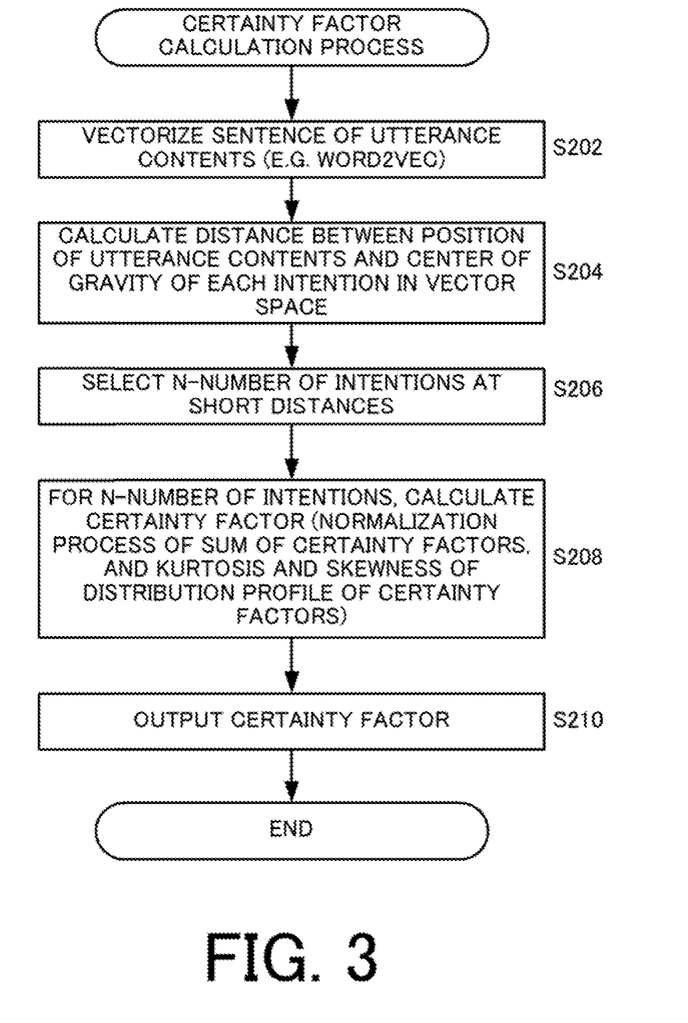
FIG. 3 is a flow chart showing a flow of a certainty factor calculation process in a chatbot.

FIGS. 2 and 3 are flowcharts showing a flow of processing in the dialogue system 1 according to the present embodiment. Hereinafter, processing in the present embodiment will be described according to the flow charts.

In step S102, the speech input unit 11 of the dialogue application 10 acquires uttered speech from a user and transmits the uttered speech to the dialogue server 20. In step S104, the speech recognizing unit 21 of the dialogue server 20 performs a speech recognition process to convert the uttered speech into a text.

In step S106, the dialogue mode estimating unit 22 estimates whether a mode of a present dialogue is task-oriented or non-task-oriented. As described earlier, the dialogue mode estimating unit 22 causes a transition of an internal state in accordance with an input utterance text. When an internal state is constituted by three or more stages, any of a task-oriented mode and a non-task-oriented mode is determined from the three or more stages of the internal state in accordance with an appropriate rule. In doing so, the dialogue mode may be determined with hysteresis by taking a previous state into consideration.

In step S108, the domain selecting unit 23 determines whether the present dialogue mode is task-oriented or non-task-oriented, and determines a present domain using a different method in accordance with the dialogue mode. When the present dialogue mode is task-oriented, processing advances to step S110, but when the present dialogue mode is non-task-oriented, processing advances to step S114.

The processing of step S110 is executed when the dialogue mode is task-oriented. In this case, the task-oriented domain selecting unit 23a transmits the utterance text of the user to all chatbots 30 and acquires certainty factors indicating a likelihood that the utterance text fits an intention that can be understood by the chatbots 30.

Figure 4:
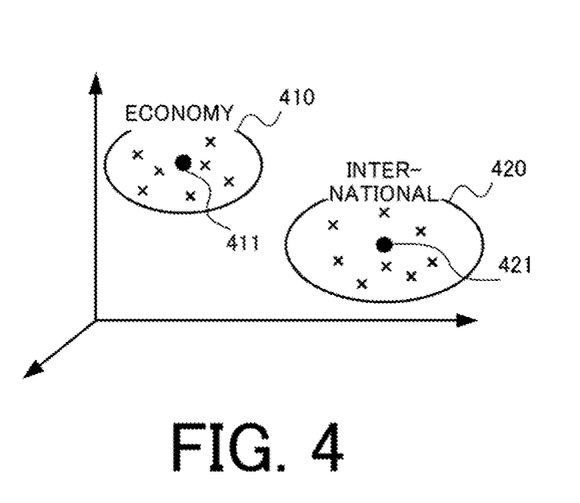
FIG. 4 is a schematic view for explaining intention understanding of utterance contents in a vector space.
Figure 5:
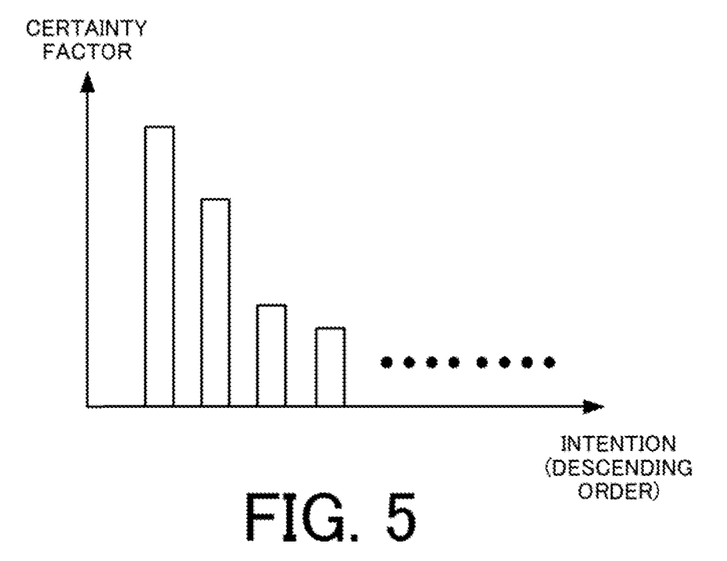
FIG. 5 is a schematic view for explaining a certainty factor of each intention calculated by a chatbot.

A certainty factor calculation process in the chatbot 30 will now be described with reference to FIGS. 3 to 5. FIG. 3 is a flow chart showing a flow of the certainty factor calculation process performed by the chatbot 30 (the intention understanding unit 31), FIG. 4 is a diagram for explaining an intention understanding process based on vectorization of a sentence, and FIG. 5 shows an example of certainty factors calculated by the chatbot 30.

In step S202, the intention understanding unit 31 obtains a feature vector representing a feature of the utterance text using a known vector analysis method (such as word2vec). In step S204, the intention understanding unit 31 calculates distances between a position of the utterance text and a plurality of intentions determined in advance in a vector space.

As described earlier, each chatbot 30 is configured to be capable of understanding a plurality of intentions determined in advance. For example, let us assume that the chatbot 30 is capable of carrying out a dialogue related to "news" and capable of understanding utterance intentions such as "acquisition of economic news" and "acquisition of international news". As shown in FIG. 4, sentences representing such predetermined intentions indicate prescribed regions (410 and 420) in the vector space. Since a position of an utterance text in the vector space is determined by vectorization of the utterance text, the intention understanding unit 31 obtains a distance between the position of the utterance text and a center of gravity position (411 or 421) of the region (410 or 420) of each intention. It should be noted that although the vector space is depicted in FIG. 4 as if the vector space is three-dimensional, the vector space actually has a higher dimension (200 dimensions or more). In addition, the number of intentions understood by the intention understanding unit 31 is actually more than two.

In step S206, the intention understanding unit 31 selects the prescribed number (N-number) of positions that are close to the utterance text. Moreover, the prescribed number N is a common number throughout the entire dialogue system 1. The prescribed number N may be determined in advance or may be specified in a domain selection request every time the dialogue server 20 issues such a request to the chatbot 30. Moreover, the prescribed number N is favorably a minimum value among intentions accommodated by the plurality of chatbots 30.

In step S208, with respect to a top N-number of intentions, the intention understanding unit 31 calculates a certainty factor representing a likelihood that the utterance text is consistent with the intention based on the distance in the vector space. FIG. 5 schematically shows a certainty factor of each intention calculated by a single chatbot 30. In doing so, all chatbots 30 calculate certainty factors in accordance with same criteria. Specifically, the intention understanding unit 31 normalizes and calculates certainty factors so that a sum of the N-number of certainty factors equals 1. Furthermore, the certainty factors are also favorably normalized so that a kurtosis (third-order moment) or a skewness (fourth-order moment) equals a prescribed value in a distribution profile of the certainty factors.

In step S210, the chatbot 30 transmits the calculated certainty factors to the dialogue server 20. In doing so, the chatbot 30 may only transmit a value of a highest certainty factor or may transmit values of certainty factors of all N-number of intentions.

Let us now return to the description of the flow chart shown in FIG. 3. In step S111, whether or not a maximum value of certainty factors obtained from each chatbot is equal to or higher than a prescribed threshold is determined. When the maximum value of the certainty factors is equal to or higher than the prescribed threshold (S111-YES), a transition is made to step S112 and the task-oriented domain selecting unit 23a determines a domain based on the certainty factors obtained from each chatbot 30. Typically, the domain selecting unit 23a determines a domain corresponding to the chatbot 30 having calculated a highest certainty factor as a domain in the present dialogue. On the other hand, when the maximum value of the certainty factors obtained from each chatbot 30 is lower than the prescribed threshold (S111-NO), a transition is made to step S114 and a domain is selected using the non-task-oriented domain selecting unit 23b.

The processing of step S114 is executed when the dialogue mode is non-task-oriented or when the dialogue mode is task-oriented but the maximum value of the certainty factors obtained from the chatbot is lower than the threshold. In this case, the non-task-oriented domain selecting unit 23b determines a domain from a word string included in the utterance text of the user. The domain selecting unit 23b has a domain dictionary which defines words related to each domain, and the domain selecting unit 23b determines a domain of the present dialogue by referring to the domain dictionary.

In step S116, the dialogue server 20 transmits an utterance text to the chatbot 30 of the domain determined in step S112 or S114. The chatbot to which the utterance text is transmitted may be determined in accordance with whether the dialogue mode is task-oriented or non-task-oriented. The response sentence generating unit 32 of the chatbot 30 generates a response text for responding to the acquired utterance text and transmits the response text to the dialogue server 20. Moreover, in the present embodiment, a method of determining a response text is not particularly limited and the response text may be generated using any existing method. The dialogue server 20 receives the response text from the chatbot 30 and transmits the response text to the dialogue application 10.

In step S118, the speech synthesizing unit 12 of the dialogue application generates speech data of the response text by a speech synthesizing process and, in step S120, outputs the speech data of the response text from the speech output unit 13.

Advantageous Effects

The dialogue system 1 according to the present embodiment is capable of accommodating a new domain by adding the chatbot 30 and the system is highly scalable. In addition, domain determination based on whether or not an utterance text is consistent with an intention that can be interpreted by the chatbot 30 is highly accurate. However, although an utterance text is often consistent with an intention that can be interpreted in cases where the dialogue is task-oriented, an utterance text is often inconsistent with an intention that can be interpreted in cases where the dialogue is non-task-oriented. Therefore, when an intention understanding process is executed by transmitting an utterance text to each chatbot even when the dialogue is non-task-oriented, the process often ends up being a waste. In consideration thereof, in the present embodiment, by performing domain selection using an intention understanding process of a chatbot only when the dialogue is task-oriented and performing domain selection based on a word string when the dialogue is non-task-oriented, both accuracy of domain selection and efficiency of processing are achieved.

In addition, in the present embodiment, since a plurality of chatbots calculate certainty factors in accordance with same criteria, the certainty factors obtained from the plurality of chatbots can be compared with each other. For example, when the calculation criteria of certainty factors are not unified, situations may arise where, even when differences in distances in a vector space are the same with respect to two intentions, one chatbot calculates certainty factors so that a large difference exists therebetween but another chatbot calculates certainty factors so as to have similar values. This renders a comparison of certainty factors calculated by different chatbots meaningless. By unifying the calculation criteria of certainty factors as in the present embodiment, certainty factors can be compared with each other in an appropriate manner and, consequently, domain selection can be accurately performed.

Modifications

The embodiment described above merely represents an example and the present invention can be implemented with various modifications without departing from the spirit and scope of the invention.

While a domain determination process is performed based on a latest utterance text in the description given above, a domain may be determined based on a prescribed number of latest utterance texts or on utterance texts within a prescribed period of time.

When the dialogue mode is switched between the task-oriented mode and the non-task-oriented mode, it is also preferable to perform domain selection by taking into consideration a domain before the switch. For example, when a switch is made from the non-task-oriented mode to the task-oriented mode, the domain selecting unit 23a may conceivably add a prescribed correction value to a certainty factor obtained from the chatbot 30 corresponding to a domain before the switch to increase the likelihood of the domain being selected. The same applies when the dialogue mode is switched from the task-oriented mode to the non-task-oriented mode. The reason why such measures are effective is that, even when dialogue modes are switched, domains often stay the same. In addition, determining a present domain by taking into consideration not only an immediately previous domain but also further previous domains is also effective, in which case a present domain may be determined by applying weight in accordance with time (the greater a separation in time, the smaller the weight).

The description of the embodiment given above assumes that the chatbot 30 returns a response to a user mainly during the task-oriented mode. However, an utterance may be made from a chatbot to a user even in the non-task-oriented (desultory chat) mode. In this case, one chatbot may accommodate both the task-oriented mode and the non-task-oriented mode or a task-oriented mode-only chatbot and a non-task-oriented mode-only chatbot may be used.

While input and output between a user and the system are performed by speech in the embodiment described above, input and output may be performed by text or input and output by both speech and voice may be accommodated.

In addition, the system configuration of the dialogue system is not limited to that shown in FIG. 1, and each function described above may be arranged in any way as long the functions can be provided as an entire system. For example, a speech recognizing unit and a dialogue mode estimating unit may be provided in a user apparatus. In addition, instead of having a single computer execute a dialogue server and a dialogue application, functions thereof may be provided by having a plurality of computers cooperate with each other.

What is claimed is:

1. A dialogue system, comprising:
an input unit configured to acquire utterance contents of a user in a dialogue;
a mode determining unit configured to determine, based on the utterance contents acquired by the input unit, whether a mode of the dialogue is task-oriented or non-task-oriented;
a plurality of intention understanding units each corresponding to a specific domain; and
a domain determining unit configured to
transmit, when the mode of the dialogue is task-oriented, the utterance contents to all of the plurality of intention understanding units, and determine a domain of the dialogue based on a result of intention understanding of the utterance contents performed using each of the plurality of intention understanding units, and
determine, when the mode of the dialogue is non-task-oriented, the domain of the dialogue prior to transmitting the utterance contents to any of the intention understanding units.

2. The dialogue system according to claim 1, wherein each of the plurality of intention understanding units outputs a certainty factor of the utterance contents being consistent with each of a plurality of intentions determined in advance.

3. The dialogue system according to claim 2, wherein each of the plurality of intention understanding units vectorizes the utterance contents, and determines, based on a distance between a position of the utterance contents and a center of gravity position of an intention determined in advance in a vector space, a certainty factor corresponding to the intention.

4. The dialogue system according to claim 2, wherein each of the plurality of intention understanding units outputs a certainty factor for a prescribed number of intentions starting from an intention with a highest certainty factor, and
the prescribed number is common among the plurality of intention understanding units.

5. The dialogue system according to claim 2, wherein each of the plurality of intention understanding units calculates the certainty factor based on same calculation criteria.

6. The dialogue system according to claim 2, wherein the domain determining unit determines, as the domain of the dialogue, a domain corresponding to an intention understanding unit having output a highest certainty factor.

7. The dialogue system according to claim 1, wherein the domain determining unit estimates a domain from a word string included in the utterance contents when the mode of the dialogue is non-task-oriented.

8. The dialogue system according to claim 1, wherein when the mode of the dialogue is switched between the task-oriented mode and the non-task-oriented mode, the domain determining unit determines a domain after the switch by taking into consideration a domain before the switch.

9. The dialogue system according to claim 1, wherein the input unit includes: a speech input unit configured to acquire uttered speech of the user; and a speech recognizing unit configured to apply speech recognition to the uttered speech to acquire the utterance contents.

10. The dialogue system according to claim 1, wherein the input unit acquires a text of utterance contents from the user.

11. A domain determination method carried out by a dialogue system, the domain determination method comprising:
- an input step of acquiring utterance contents of a user in a dialogue;
- a mode determining step of determining, based on the utterance contents acquired in the input step, whether a mode of the dialogue is task-oriented or non-task-oriented;
- an intention understanding step of performing intention understanding by a plurality of intention understanding units each corresponding to a specific domain; and
- a domain determining step of determining a domain of the dialogue, wherein
    - when the dialogue is task-oriented, the utterance contents are transmitted to all of the plurality of intention understanding units, and the domain of the dialogue is determined based on a result of intention understanding performed using the intention understanding units each corresponding to the specific domain, and
    - when the mode of the dialogue is non-task-oriented, the domain of the dialogue is determined prior to transmitting the utterance contents to any of the intention understanding units.

\* \* \* \* \*